United States Patent [19]
Schmidt et al.

[11] Patent Number: 4,890,909
[45] Date of Patent: Jan. 2, 1990

[54] DUAL MOUNTING ASSEMBLY FOR MIRRORS

[76] Inventors: William P. Schmidt, 21000 Woodruff, Rockwood, Mich. 48173; Frank D. Hutchinson, 28000 Bell Rd., New Boston, Mich. 48164; Kirk Malcomson, 3329 Elizabeth Dr., Trenton, Mich. 48183

[21] Appl. No.: 310,241

[22] Filed: Feb. 13, 1989

Related U.S. Application Data

[63] Continuation-in-part of Ser. No. 81,796, Aug. 5, 1987, and a continuation-in-part of Ser. No. 83,281, Aug. 10, 1987.

[51] Int. Cl.⁴ ............................................... B60R 1/06
[52] U.S. Cl. .................................... 350/616; 248/484; 248/486; 350/626; 350/639

[58] Field of Search ............... 350/610, 611, 616, 626, 350/627, 604, 609, 631, 632, 634; 248/476, 477, 478, 479, 480, 475.1

[56] References Cited

U.S. PATENT DOCUMENTS

| | | | |
|---|---|---|---|
| 4,156,557 | 5/1979 | Skewis | 350/616 |
| 4,208,104 | 6/1980 | Peterson | 350/616 |
| 4,804,257 | 2/1989 | Schmidt et al. | 350/626 |
| 4,830,326 | 5/1989 | Schmidt et al. | 350/616 |

Primary Examiner—Bruce Y. Arnold
Attorney, Agent, or Firm—Arnold S. Weintraub

[57] ABSTRACT

A mirror mounting apparatus for having two separate mounting assemblies. The first mounting assembly mounts directly to the vehicle. The second mounting assembly with attached mirrors mounts on the first mounting assembly. A clamping bracket or brackets having to separate pieces is insertable in one or more slots of the second assembly to clamp the first and second assemblies together.

17 Claims, 3 Drawing Sheets

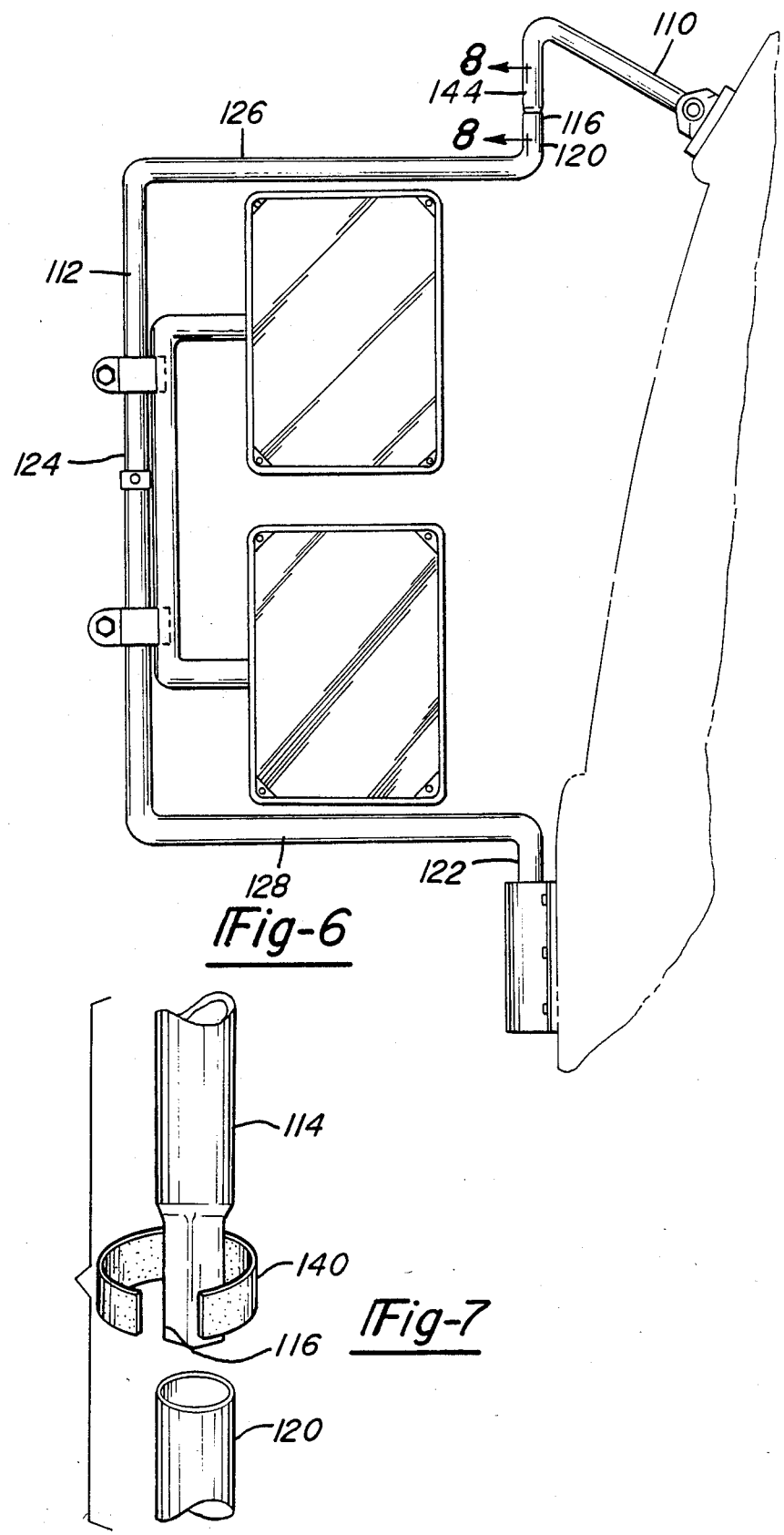

DUAL MOUNTING ASSEMBLY FOR MIRRORS

CROSS-REFERENCE TO RELATED APPLICATION

This application is a continuation-in-part application of copending U.S. patent applications Ser. No. 081,796, filed Aug. 5, 1987 and Ser. No. 083,281, filed Aug. 10, 1987 for "Vehicle Door Mounted Dual Mirror Assembly", and "Vibration Damped Mirror Apparatus for a Vehicle", respectively, the disclosures of which are hereby incorporated by reference.

BACKGROUND OF THE INVENTION

Field of the Invention

The present invention is directed to a dual outside mirror assembly adapted to be mounted on a vehicle door. Even more particularly, the present invention concerns improved means for mounting and assembling vehicular exterior assemblies.

Prior Art

Dual mirror assemblies are particularly useful on pickup trucks, van-type vehicles, recreational vehicles and other vehicles where rearward visibility from the driver's seat is restricted.

The mirror frame taught by U.S. Pat. No. 4,804,257 defines a dual mirror, dual support bracket. The dual mounting bracket includes a first and second mounting assembly. The second mounting assembly comprises two L-shaped brackets held together by means of a set screw insertable through apertures located in the L-shaped brackets. The axis of the second bracket is attached to the axis of the first bracket by means of complex double ring clamps which receive a plurality of fasteners.

Other prior art. teaches a double mirror assembly mounted to a single frame member. A variety of mounting brackets are utilized. Examples of such patents are U.S. Pat. No. 4,208,104 to Peterson. This invention utilizes "dog leg" bracket having two spaced apart L-shaped brackets attached to the mirror, and a second cylindrical bracket having a planar extension with an aperture for receipt of a fastening means. The mirror is attached to a mounting bracket, such as an elongated tubular member by means of the second bracket which fits over the tubular member and the planar section fits between the two L-shaped brackets on the mirror. The aperture of the planar section and the aperture of the mirror bracket are aligned and a fastening means inserted to secure the mirror to the mounting frame.

An alternative embodiment of a dual mirror assembly is taught in U.S. Pat. No. 4,156,557 to Skewis. This unit also utilizes a single mounting frame. The attachment brackets for the mirrors to the mounting frame comprise double collet mounting collars which fit over the mounting frame. A horizontally extending piece having an aperture to fit over the mounting frame and an aperture to receive a fastening means is located between the two collars. The horizontal member connects to one or more additional horizontally extending members which are attached to a vehicle.

In the above-referred to copending parent applications there is taught a dual support assembly which includes first and second mirror mounting assemblies, the first mounting assembly being a two piece mounting bracket, and the second mounting assembly being a single piece mounting bracket. A vibration absorption means comprising a telescoping first section and an open diameter second section is incorporated into the first mounting assembly. The bracketry is adapted for mounting on vehicle doors of varying angles. The axis of the first bracket is attached to the axis of the second bracket by double ring clamps which receive a plurality of fasteners.

It is to be appreciated from the foregoing that there still exists a need in the prior art to simplify the mounting assemblies and it is to this to which the present invention is directed.

SUMMARY OF THE INVENTION

A dual mirror mounting assembly embodying the present invention includes:

(a) at least one pair of vertically spaced apart mirrors each having a visual reflective surface;

(b) a first attachment means to be mounted to the vehicle surface comprising a generally U-shaped member, having an elongated post, with first and second ends, the first and second ends having first and second spaced apart legs respectively extending from the first and second ends, the legs being perpendicular to the post;

(c) a second attachment means comprising:
  (i) a first L-shaped section having a generally vertically extending bar, having first and second opposed ends, and a generally horizontal member, which attaches to the first end of the bar at approximately a right angle, and a mirror being attached to the horizontal member, and the second end of the bar comprising a vertically extending pilot of a smaller diameter than the bar protruding from the end of the bar, the bar also having a vertical slot located along its longitudinal axis;
  (ii) a second L-shaped section comprising a vertically extending member or bar, having first and second opposed ends, and a generally horizontally extending member which attaches to the second end of the bar at approximately a right angle, a mirror being attached to the horizontal member, and the first end of the bar comprising an open tube to receive the pilot tube from the bar of the first L-shaped section, the bar also having a vertical slot located along its longitudinal axis;

(d) at least one clamping bracket insertable into an associated slot for joining the first attachment means to the second attachment means;

(e) a fastening means to secure at least one clamping bracket about the first attachment means.

The first attachment means is connected directly to the vehicle surface. The second attachment means with the attached dual mirrors receives the clamping bracket (s) in the slot (s) located along its longitudinal axis (axes). The clamping bracket is then fitted around the first attachment means and secured by a fastening means. The second attachment means comprising the two L-shaped sections is adapted to allow minimal rotation about a vertical axis, due to its two-part configuration. The mirrors may rotate about the horizontal members of the second attachment means. The first attachment means may be permanently or removably attached to the vehicle surface by any suitable fastening means, such as a stud or screw.

BRIEF DESCRIPTION OF THE DRAWINGS

FIG. 6 is an alternative embodiment of a two piece first attachment means;

FIG. 7 is a view of the telescoping section of the first attachment means; and

DETAILED DESCRIPTION OF THE PREFERRED EMBODIMENT

Figure 2:
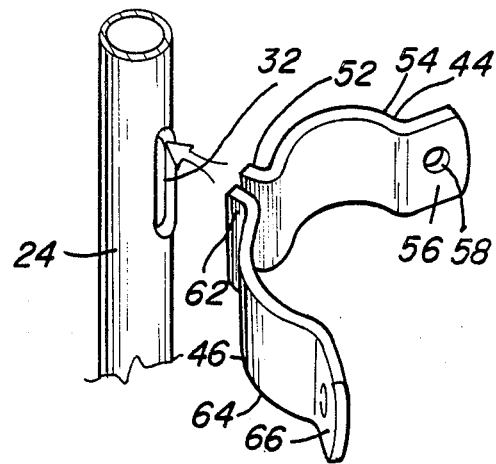
FIG. 2 is an exploded view of the clamping means and receiving slot of the mirror assembly.

Throughout the following description, an identical reference number is used to refer to the same component shown in multiple figures of the drawing.

Referring now to the drawing and in reference to FIGS. 1-8, there is illustrated a dual mirror assembly 10 to be mounted on the side of a vehicle where a first attachment means is mounted to a vehicle surface and a second attachment means with connected mirrors is attached to the first attachment means.

The dual mirror assembly of the present invention is advantageously used with large size vehicles, such as semi-trailers, large single body trucks or any vehicle where an increased field of vision along a vertical axis is desired. Also, the mirror apparatus 10 may be employed on the exterior sides of either or both the driver or passenger sides of the vehicle.

Figure 1:
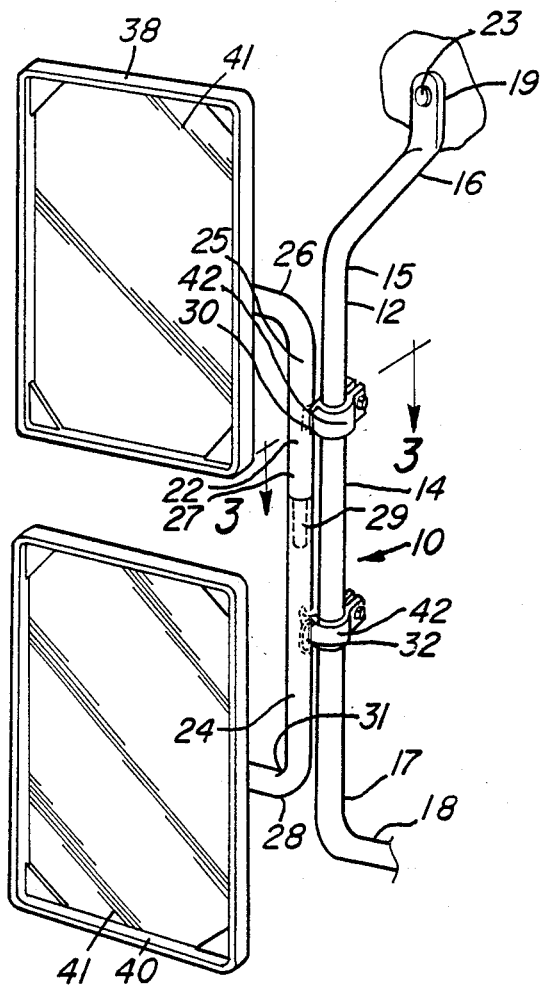
FIG. 1 is a front view of the mirror apparatus of the present invention.

As shown in FIG. 1, the mirror apparatus 10 includes first and second mirrors or mirror assemblies 38 and 40 respectively. The mirror may be of any suitable size or shape, such as rectangular, square, circular, etc. as desired by the operator of the vehicle, for safe operation of the vehicle or to meet government standards. The mirror may be formed of any suitable material. The visual reflective surface of the mirror noted in general by reference numeral 41 is mounted on one side facing the occupants of the vehicle when the mirror assembly 10 is mounted.

The exterior surface of the reflective surface may have any particular form, such as a planar or convex outwardly extending shape, depending on the particular application.

Returning to the drawing, and in particular FIG. 1, there is shown a first attachment means generally denoted at 12 and which is adapted to be mounted to a vehicle surface. The first attachment means, generally, comprises a U-shaped member, defined by an elongated post 14 having first and second opposed ends 15, 17, respectively. The post 14 is preferably a hollow, metallic, cylindrical member.

First and second legs 16 and 18 are attached to or integrally formed with the first and second ends 15, 17 of the post 14, as shown. Preferably, the first and second legs 16, 18 are integrally formed with the post 14 and are bent at a gradually increasing angle until they extend at an angle greater than or equal to 90° as shown in FIG. 1. The legs 16, 18 have end sections 19 (only one being shown) which may be bent and flattened so that the end section is in a plane parallel to the attachment surface and substantially perpendicular to the leg section. This bent and flattened section may also have an aperture, shown at 23, to receive a fastening means (not shown) such as a sheet metal screw, for fastening the first attachment means to the vehicle. It should also be understood that the legs 16, 18 may be separately attached to the post 14 by means of welding, etc.

Figure 5:
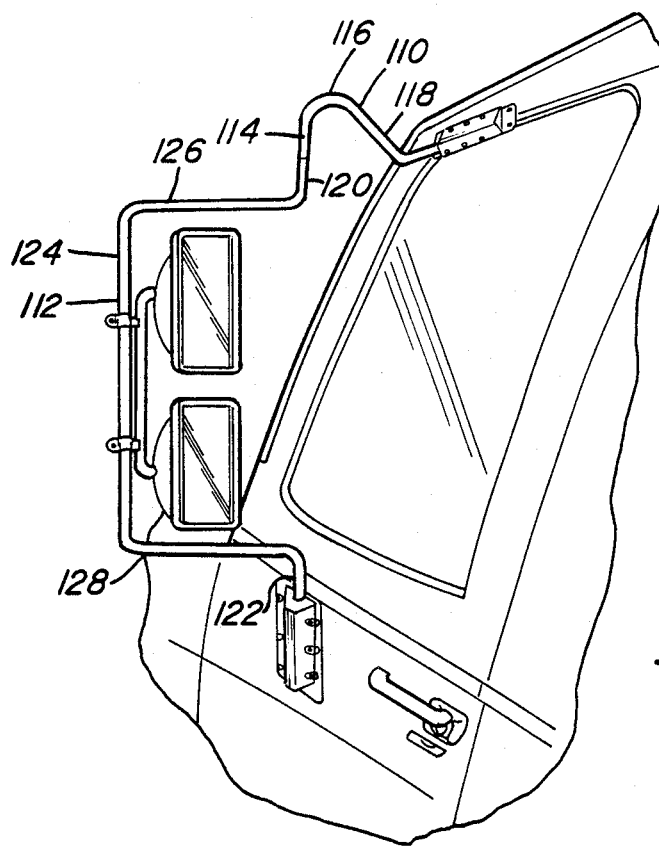
FIG. 5 is a view of the two piece first attachment means.
Figure 8:
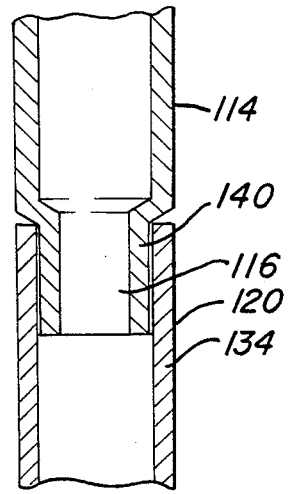
FIG. 8 is a sectional view of the telescoping section of the first attachment means.

Alternatively, the first attachment means may comprise the two part assembly set forth in copending U.S. Ser. No. 081,796 filed Aug. 5, 1987. As defined in the copending application, and as shown in FIGS. 5 and 6 hereof, the first attachment means comprises an upper frame member 110 and a lower frame member 112. The upper frame member 110 includes a vertically extending end section 114 which forms a telescoping section 116. The telescoping section is crimped or squared to form a flat surface. The lower frame member 112 comprises an open faced tubular member 120 which receives the crimped telescoping section 116. As shown in FIG. 8, the tubular member may contain an inner adaptor 134 made from a material of some resilience so that it may exert a frictional grip on the telescoping section 116. As shown in FIG. 7, the crimped, telescoping section 116 may be wrapped with a foam tape 140 which shreds and compiles. The tape 140 is preferably a closed cell, polyurethane, double-sided adhesive type.

The tape securely holds the telescoping end within the lower section of the frame member and dampens vibration therebetween.

As shown in FIGS. 5 and 6, lower frame member 112 includes vertically extending upper and lower end sections 120, 122, respectively, vertically spaced from each other and extending coaxially along a common vertical axis. A vertically extending central section 124 of lower frame member 112 is integrally joined at its upper and lower ends respectively to the upper 120 and lower 122 end sections as by horizontally extending sections 126, 128. Upper and lower frame members 110 and 112 are formed by bending lengths of tubular metal stock into the configuration shown.

As shown in FIGS. 5 and 6, when the telescoping upper section is received into the open faced lower section, rotation of the upper and lower sections of the first attachment means is facilitated about a vertical axis. The first frame member may be attached to the vehicle by means of a clamping bracket, as shown in FIGS. 5 and 6, or may have an aperture at either end thereof for receipt of a fastening means.

In a preferred embodiment hereof and as shown in Figure 1, the second attachment means is generally U-shaped and comprises two separable L-shaped members 22 and 24. The member 22 is preferably, an integrally formed L-shaped member having a generally vertically extending member or bar with first and second opposed ends 25, 27, respectively and a generally horizontal member denoted at 26. The horizontal member attaches to the first opposed end 25 of the vertical bar 22 at approximately a right angle or is integrally formed with the vertical bar. A mirror 28 is attached to the horizontal member. The second opposed end 27 of the vertical bar 22 forms a vertically extending pilot 36 of a smaller diameter than the vertical bar, protruding from the end of the bar. This pilot may be wrapped with shock absorbing material, such as the polyurethane tape hereinabove referred to, which acts as a vibration absorption means for the mirror assembly. Also located on the vertical bar 22 is a slot 30, located along the longitudinal axis of the bar.

A second L-shaped member likewise comprises a generally vertically extending member or bar denoted at 24 having first and second opposed ends 29 and 31. A generally horizontal member 28 attaches to the second opposed end 31 at an approximately right angle or is integrally formed therewith. A mirror 40 is attached to the horizontal member. The first opposed end 29 is an open tube which receives the pilot from the first L-shaped section. The open tube may contain an inner adaptor of some resilience so that it exerts a frictional grip on the pilot. The vertical member 24, also, has a slot 32 located along its longitudinal axis. The separable L-shaped members, 22, 24 are preferably hollow, tubular cylindrical members.

As shown in FIG. 1, the reduced diameter pilot 36 is disposed within the opening 34 of the second L-shaped member 24. The end of the pilot may be opened or closed. Preferably, the pilot is crimped or flattened for vibration absorption. The crimped or flattened pilot 36 has a vibration damping effect and provides structural integrity within the attachment means. For additional vibration damping, the pilot may be wrapped with a vibration damping material, such as a foam type which shreds and compiles. This type is preferably of a closed cell, polyurethane, double-sided adhesive type.

Figure 3:
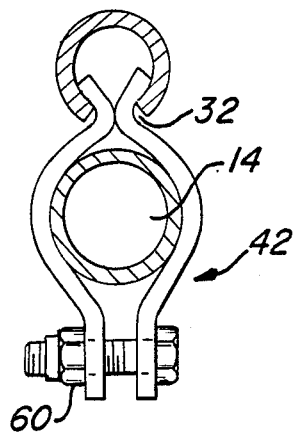
FIG. 3 is a view of the clamping apparatus in an operative position.
Figure 4:
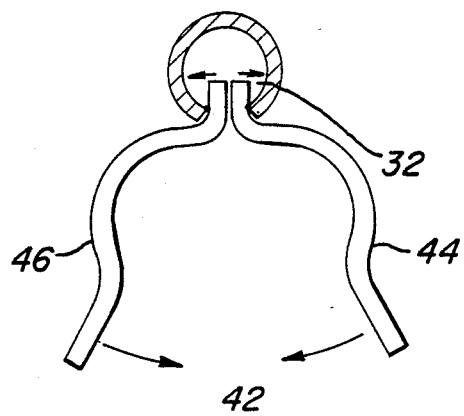
FIG. 4 is a view of the clamping bracket in open position.

The first attachment means is connected to the second attachment means by a clamping means denoted at 42. The clamping means generally comprises two spaced apart members, shown in FIG. 2 and denoted at 44 and 46. Each clamping member has the same shape with a first flap planar portion 52, 62 an outwardly extending arcuate portion 54, 64 which extends to a second planar portion 56, 66, the second planar portions having an aperture located therein for receipt of a fastening means. When the two members of the clamping bracket are disposed in adjoining fastening abutment they form a mirror image of one another wherein the first planar ends 52 and 62 are aligned and inserted into the slot located in the bar of the second attachment means and the arcuate portions curve away from each other. The circle formed by the abutment of the two members of the clamping bracket can then be fitted over the bar of the first attachment means and the apertures 58 and 68 of the second planar members may be aligned to receive a fastening means. The fastening means is shown in FIG. 3 and denoted at 60.

The fastening means denoted at 60 covers the plurality of fastening means which may be utilized for this purpose. Shown at 60 is a common bolt and nut-type fastener. Any appropriate fastener may be used for this purpose. The fastening means is tightened to secure the two arcuate portions around the bar of the first attachment means, thus securely attaching the second attachment means to the first attachment means. The first attachment means is in turn securely mounted to the vehicle.

The present invention offers an improvement over other mirror mounting brackets as the dual mounting assembly increases the field of vision. It does this by allowing rotation of the second mounting assembly about the vertical axis of the first mounting assembly.

The mirror mounting assembly also provides vibration damping to the mirrors. The dual mounting assembly absorbs vibration from movement of the vehicle and prevents excessive mirror vibration which can blur vision and loosen mirror bracketry. Since the mirrors are not attached directly to the vehicle, the separate first assembly absorbs vibration so it is minimally transmitted to the mirrors on the second assembly. Also, the structure of the pilot on the second assembly provides shock absorption and reduces any vibration that is transmitted.

The clamping bracketry joining the first and second mounting assemblies is a simplification over the prior art. Excessive use of fasteners and use of elaborate fasteners is eliminated by the insertion of the bracketry into a slot located in the second assembly where a single fastening means closes the bracketry about the first mounting assembly.

Clearly, the assembly design, structure and connecting bracket provide advancement and improvement over the prior art.

What is claimed is:

1. A dual mounted dual mirror assembly for attachment to a vehicle, comprising:
   (a) a pair of spaced apart mirrors each having at least one visual reflective surface;
   (b) a first attachment means to be mounted to a vehicle surface;
   (c) a second attachment means for securing the pair of mirrors to the first attachment means, the second attachment means having a pair of spaced apart slots formed therein;
   (d) at least one clamping bracket associated with each slot, each bracket being removable and emplaceable within its associated slot, each bracket interconnecting an associated mirror with an associated slot; and
   (e) a fastening means to secure the clamping bracket about the first attachment means.

2. The dual mirror assembly of claim 1 wherein the first and second mirrors are vertically spaced apart.

3. The dual mirror assembly of claim 1 wherein the first attachment means comprises a generally U-shaped member, having an elongated post, with first and second ends, the first and second ends having first and second spaced apart legs, respectively, extending from the first and second ends, the legs being perpendicular to the post.

4. The dual mirror assembly of claim 3 further comprising a means for connecting the first and second ends of the first attachment means to a vehicle surface.

5. The dual mirror assembly of claim 1 wherein the first attachment means comprises a two part bracket having:
   (a) an upper frame member comprising a vertically extending end section which forms a telescoping section; and
   (b) a lower open faced tubular member which receives the telescoping section.

6. The dual mirror assembly of claim 5 wherein the telescoping section of the first attachment means is enclosed by a vibration absorbing material.

7. The dual mirror assembly of claim 5 wherein the vertically extending pilot is enclosed by a vibration absorbing material.

8. The dual mirror assembly of claim 1 wherein the second attachment means comprises:
   (a) a first L-shaped section having a generally vertically extending bar having first and second opposed ends, and a generally horizontal member which attaches to the first end of the bar, one mirror being attached to the horizontal member, and the second end of the bar comprising a vertically extending pilot of a smaller diameter than the bar;

(b) a second L-shaped section comprising a vertically extending bar having first and second opposed ends and a generally horizontal member which attaches to the second end of the bar, the first end of the bar comprising an open tube to receive the pilot from the bar of the first L-shaped section.

9. The dual mirror assembly of claim 8 wherein the vertically extending pilot is flattened.

10. The dual mirror assembly of claim 1 wherein the clamping bracket comprises two members, each having the same shape with a flat planar portion, an outwardly extending circular arcuate portion which extends to a second planar portion, the first planar portion being insertable in the slot of the vertical bar of the second attachment means and the second planar portion having an aperture for receipt of a fastening means.

11. The dual mirror assembly of claim 10 wherein the clamping bracket defines a means to connect the first attachment means to the second attachment means when the planar first ends of the first and second bracket members are in abutment for insertion into the vertical slot located on the second attachment means, and the arcuate portions of each member curve away from each other to form an opening to receive the post of the first attachment means, and the second planar ends abut and align to receive a fastening means through the aperture of each, for attaching the two clamping members together.

12. The dual mirror assembly of claim 11 wherein the fastening means comprises a nut and bolt.

13. The dual mirror assembly of claim 11 wherein the second attachment means is rotatable about the post of the first attachment means by loosening of the fastening means of the clamping bracket.

14. The dual mounted dual mirror assembly for attachment to a vehicle, comprising:

(a) a pair of vertically spaced apart mirrors each having at least one visual reflective surface;

(b) a first attachment means to be mounted to a vehicle surface comprising a generally U-shaped member, having an elongated post, with first and second ends, the first and second ends having first and second spaced apart legs respectively extending from the first and second ends, the legs being perpendicular to the post;

(c) a second attachment means for securing the pair of mirrors to the first attachment means comprising: first and second L-shaped sections, each L-shaped section having an attached mirror, the first and second L-shaped sections having pairs of spaced apart slots formed therein;

(d) at least one clamping bracket associated with each slot each bracket being removably emplaceable within its associated slot, and each bracket interconnecting an associated means within associated slot; and (e) a fastening means to secure the clamping bracket about the first attachment means.

15. The dual mirror assembly of claim 14 wherein the first L-shaped section has a generally vertically extending bar having first and second opposed ends, the generally horizontal extending member attaching to the first end of the bar for attachment of a mirror, and the second end of the bar comprising a vertically extending pilot having a smaller diameter than the bar; and the second L-shaped section comprising a vertically extending bar having first and second opposed ends, the generally horizontal member attaching to the second end of the bar, for attachment of the mirror, and the first end of the bar comprising an open tube to receive the pilot from the bar of the first L-shaped section.

16. The dual mirror assembly of claim 14 wherein the clamping bracket comprises two members, each having the same shape with a flat planar portion, an outwardly extending circular arcuate portion which extends to a second planar portion, the first planar portion being insertable in the slot of the second attachment means and the second planar portion having an aperture for receipt of a fastening means.

17. The dual mirror assembly of claim 14 wherein the clamping bracket defines a means to connect the first attachment means to the second attachment means when the planar first ends of the first and second bracket members are in abutment for insertion into the vertical slot located on the second attachment means and the arcuate portions of each member curve away from each other to form an opening to receive the posts of the first attachment means, and the second planar ends abut and align to receive a fastening means to the aperture of each, for attaching the two clamping members together.

* * * * *